United States Patent
Keesey et al.

(10) Patent No.: US 6,598,055 B1
(45) Date of Patent: Jul. 22, 2003

(54) GENERIC CODE FOR MANIPULATING DATA OF A STRUCTURED OBJECT

(75) Inventors: James Louis Keesey, Sunnyvale, CA (US); Gerald Johann Wilmot, Marina, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/471,718

(22) Filed: Dec. 23, 1999

(51) Int. Cl.⁷ ............................................. G06F 17/30
(52) U.S. Cl. ....................................... 707/103 R; 707/2
(58) Field of Search ................... 707/1, 2, 3, 100–102, 707/103 R, 103, 103 Y–103 Z; 709/315, 316

(56) References Cited

U.S. PATENT DOCUMENTS

| | | | | |
|---|---|---|---|---|
| 5,566,329 A | * | 10/1996 | Gainer et al. ................... | 707/4 |
| 5,737,736 A | | 4/1998 | Chang ......................... | 707/102 |
| 5,742,810 A | * | 4/1998 | Ng et al. ....................... | 707/4 |
| 5,787,413 A | | 7/1998 | Kauffman et al. .............. | 707/2 |
| 5,799,310 A | | 8/1998 | Anderson et al. ........... | 707/102 |
| 5,873,083 A | * | 2/1999 | Jones et al. ..................... | 707/4 |
| 5,890,160 A | * | 3/1999 | Hembry ...................... | 707/103 |
| 5,893,095 A | | 4/1999 | Jain et al. ...................... | 707/6 |
| 5,999,943 A | * | 12/1999 | Nori et al. .................. | 707/104 |
| 6,061,690 A | * | 5/2000 | Nori et al. ................... | 707/103 |
| 6,067,542 A | * | 5/2000 | Carino, Jr. ....................... | 707/4 |
| 6,085,223 A | * | 7/2000 | Carino, et al. ............... | 709/203 |
| 6,128,621 A | * | 10/2000 | Weisz ......................... | 707/103 |
| 6,243,718 B1 | * | 6/2001 | Klein et al. .................. | 707/203 |
| 6,327,597 B1 | * | 12/2001 | McKinley et al. .......... | 707/206 |
| 6,338,056 B1 | * | 1/2002 | Dessloch et al. .............. | 707/2 |
| 6,343,286 B1 | * | 1/2002 | Lee et al. ...................... | 707/3 |
| 6,343,293 B1 | * | 1/2002 | Lyle .......................... | 707/101 |
| 6,353,818 B1 | * | 3/2002 | Carino, Jr. ..................... | 707/2 |
| 6,366,934 B1 | * | 4/2002 | Cheng et al. ............... | 715/513 |
| 6,421,656 B1 | * | 7/2002 | Cheng et al. .................. | 707/2 |
| 6,424,964 B1 | * | 7/2002 | Nakano et al. ................ | 707/1 |
| 6,502,086 B2 | * | 12/2002 | Pratt ............................. | 707/1 |
| 6,505,211 B1 | * | 1/2003 | Dessloch et al. ............. | 707/10 |
| 6,519,597 B1 | * | 2/2003 | Cheng et al. ................. | 707/10 |

OTHER PUBLICATIONS

M. Rennhackkamp, "Extending Relational DBMSs," DBMS, vol. 10, No. 13, pp. 45–46, 48, 50–51, Dec. 1997.

* cited by examiner

Primary Examiner—Maria N. Von Buhr
(74) Attorney, Agent, or Firm—Gates & Cooper LLP (57) ABSTRACT

A technique for providing generic code for manipulating a structured object stored on a data store connected to a computer. Initially, an encoded identifier is received. The encoded identifier is decoded to identify a location within the structured object. When data is to be stored, data is stored at the identified location. When data is to be retrieved, data is retrieved from the identified location.

33 Claims, 5 Drawing Sheets

GENERIC CODE FOR MANIPULATING DATA OF A STRUCTURED OBJECT

BACKGROUND OF THE INVENTION

1. Field of the Invention.

This invention relates in general to database management systems performed by computers, and in particular, to providing generic code for manipulating data of a structured object.

2. Description of Related Art.

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of performing the query.

Traditionally, a RDBMS stored simple data, such as numeric and text data. In a traditional RDBMS, the underlying storage management has been optimized for simple data. More specifically, the size of a record is limited by the size of a data page, which is a fixed number (e.g., 4K) defined by a computer developer. This restriction in turn poses a limitation on the length of columns of a table. To alleviate such a restriction, most computer developers today support a new built-in data type for storing large objects (LOBs) or binary large objects (BLOBs).

Large objects, such as image data, typically have a structure that is not recognized by the RDBMS. Thus, information stored in structured binary large objects (BLOBs), such as images, video, or audio, has traditionally been accessed via application programs. If these BLOBs were stored in a database, then the application developer writes a set of user defined functions (UDFs) that retrieve the information stored in these structured BLOBs or the application developer writes an application that extracts the structured large object (LOB) and then accesses the information. Both of these approaches require the application programmer to write specific code to access the information in the structured BLOB.

There is a need in the art for an improved technique for accessing structured data.

SUMMARY OF THE INVENTION

To overcome the limitations in the prior art described above, and to overcome other limitations that will become apparent upon reading and understanding the present specification, the present invention discloses a method, apparatus, and article of manufacture for providing generic code for manipulating data of a structured object stored on a data store connected to a computer.

According to an embodiment of the invention, a structured object stored on a data store connected to a computer is manipulated. Initially, an encoded identifier is received. The encoded identifier is decoded to identify a location within the structured object. When data is to be stored, data is stored at the identified location. When data is to be retrieved, data is retrieved from the identified location.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
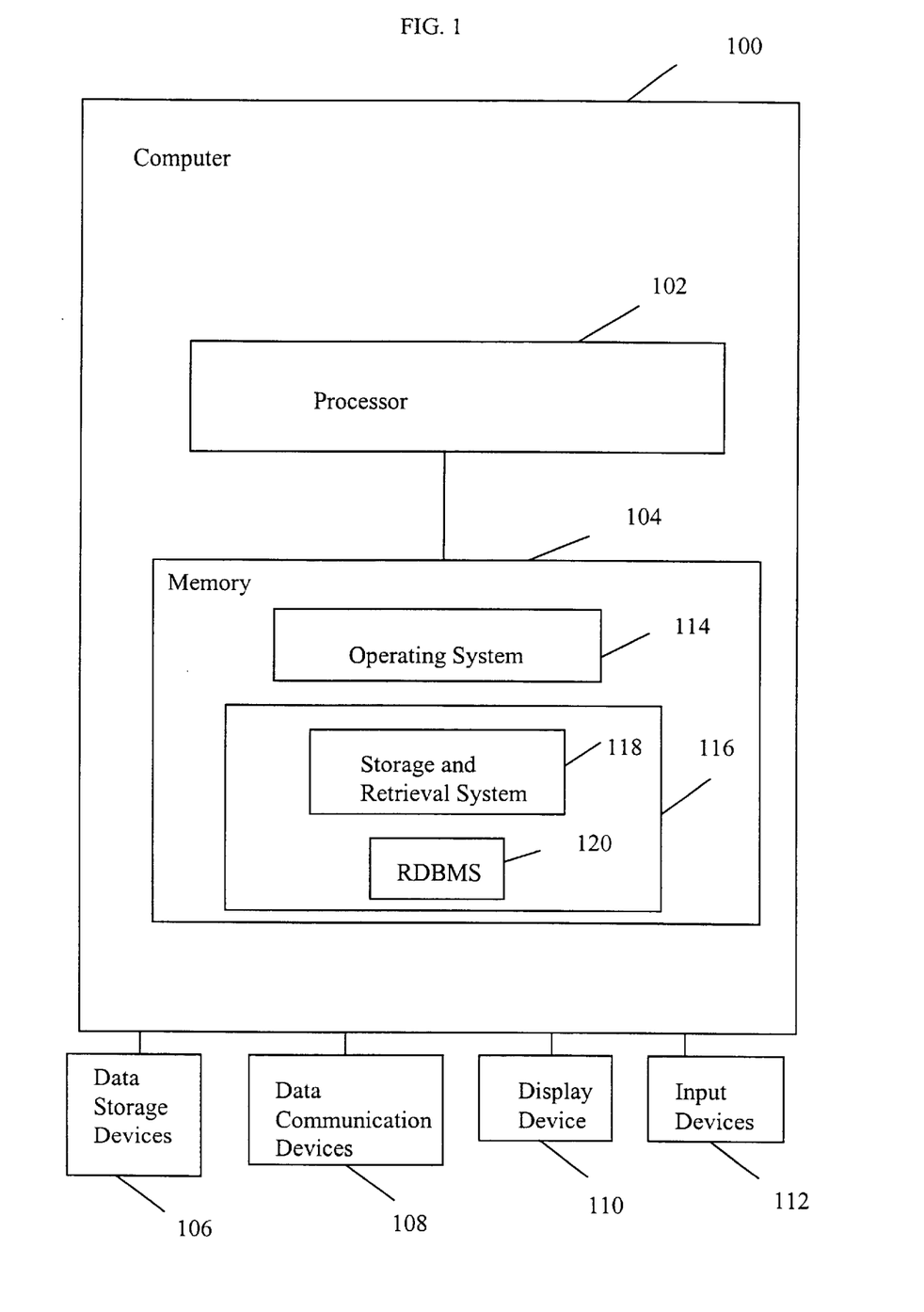
FIG. 1 is a hardware environment used to implement an embodiment of the invention.

FIG. 1 is a hardware environment used to implement an embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), display device 110 (e.g., CRT, LCD display, etc.), input devices 112 (e.g., mouse pointing device and keyboard). It is envisioned that attached to the computer 100 may be other devices, such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 114. The operating system 114 is booted into the memory 104 of the computer 100 for execution when the computer 100 is powered-on or reset. In turn, the operating system 114 then controls the execution of one or more computer programs, such as a storage and retrieval system 118 or RDBMS software 120, by the computer 100. The present invention is generally implemented in these computer programs 116, which execute under the control of the operating system 114 and cause the computer 100 to perform the desired functions as described herein.

Additionally, the present invention works with relational database management system (RDBMS) software 120, such as the DB2 product sold by IBM Corporation, although it may be implemented with any database management system (DBMS) software. The RDBMS software 120 receives commands from users for performing various search and retrieval functions, termed queries, against one or more databases stored in the data storage devices 106. In an embodiment, these queries conform to the Structured Query Language (SQL) standard, although other types of queries could also be used without departing from the scope of the invention.

The operating system 114 and computer programs 116 are comprised of instructions which, when read and executed by the computer 100, causes the computer 100 to perform the steps necessary to implement and/or use the present invention. Generally, the operating system 114 and/or computer programs 116 are tangibly embodied in and/or readable from a device, carrier, or media, such as memory 104, data storage devices 106, and/or data communications devices 108. Under control of the operating system 114, the computer programs 116 may be loaded from the memory 104, data storage devices 106, and/or data communications devices 108 into the memory 104 of the computer 100 for use during actual operations.

Thus, the present invention may be implemented as a method, apparatus, or article of manufacture using standard programing and/or engineering techniques to produce software, firmware, hardware, or any combination thereof. The term "article of manufacture" (or alternatively, "computer program product") as used herein is intended to encompass a computer program accessible from any computer-readable device, carrier, or media of course, those skilled in the art will recognize many modifications may be made to this configuration without departing from the scope of the present invention.

Those skilled in the art will recognize that the environment illustrated in FIG. 1 is not intended to limit the present invention. Indeed, those skilled in the art will recognize that other alternative hardware environments may be used without departing from the scope of the present invention.

Generic Code for Manipulating Data of a Structured Object

An embodiment of the invention provides a storage and retrieval system 118 for storing data into and retrieving data out of a structured object (e.g., a binary large object or "BLOB"). The storage and retrieval system ("S.R. system") 118 eliminates the need for an application programmer to write code to access the information in a structured object.

The S.R. system 118 is comprised of generic code that works with a base 36 numbering scheme to allow a user or application programmer to define user defined functions (UDFs) that will store and retrieve information from a structured object using one or more internal functions. All of the information determining the format, type, length, and location of the data is encoded in the user defined function's specific name.

The following example SQL statements indicate the usage of a binary large object (BLOB). One skilled in the art would recognize that this or other SQL statements could include this or other structured objects.

CREATE TABLE movieTable ( . . . , movie BLOB (1M), . . . );
INSERT INTO movieTable VALUES ( . . . , :movieHv, . . . );
SELECT movieTitle from movieTable WHERE rating= 'PG';

For the above SQL statements, the Create statement creates a table, movieTable, that includes a "movie" column for a binary large object, BLOB, that can have a maximum size of one megabyte (1M). The RDBMS does not understand what the binary large object is and views the binary large object as a "black box". The binary large object can be an image or audio data or could be a programming language object (e.g., C++, Java, etc.) or a Common Object Module (COM) object (e.g., an OLE document). The Insert statement is a type of modification statement that inserts data into a table. It is to be understood that other types of modification statements may be used, such as an Update statement that updates data in a table. The Select statement selects particular data from a table.

Figure 2:
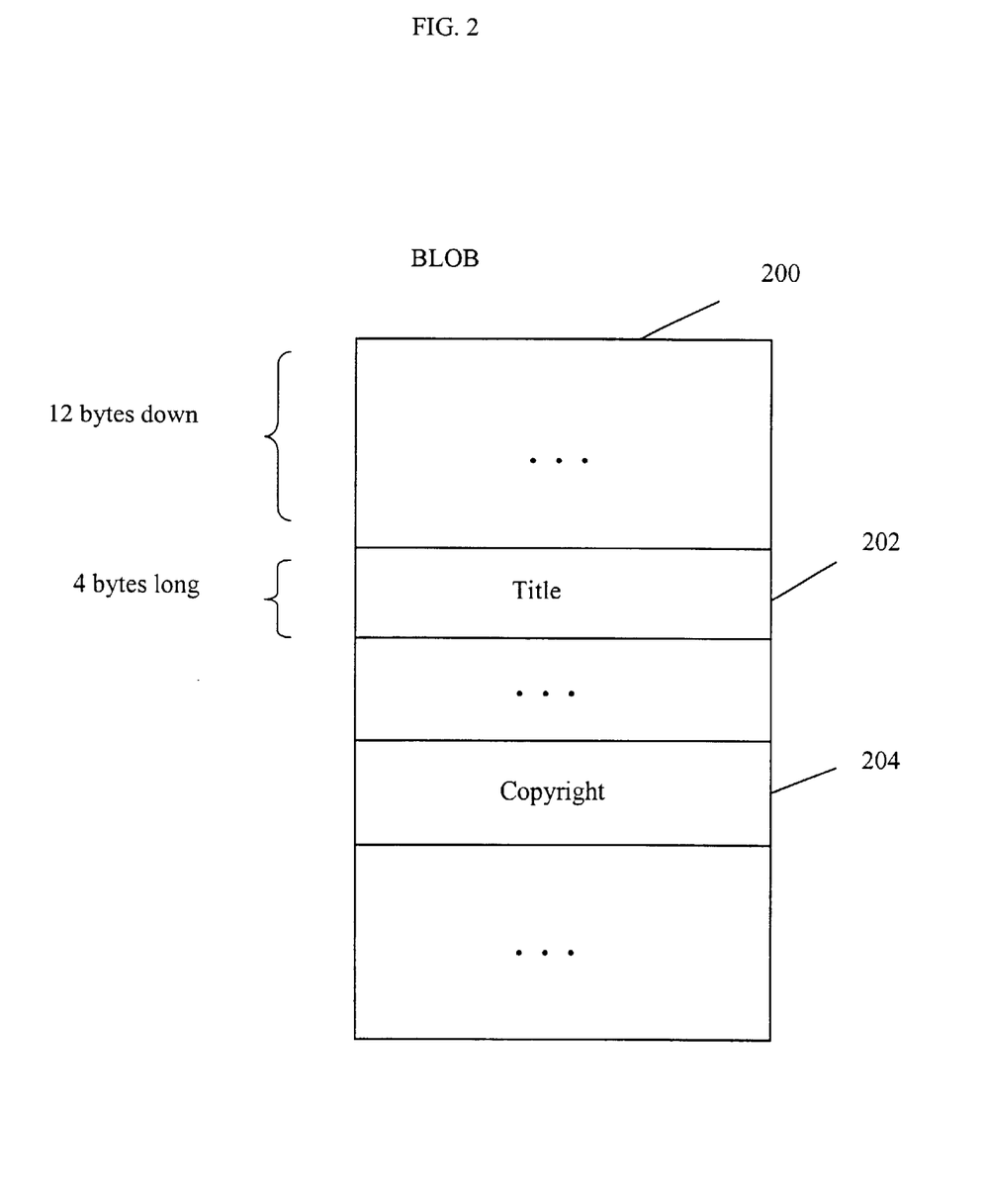
FIG. 2 is a diagram illustrating a binary large object.

FIG. 2 is a diagram illustrating a binary large object The BLOB 200 has several attributes, such as "Title" 202 and "Copyright" 204. The "Title" attribute 202 is 12 bytes down from the beginning of the BLOB 200 and is 4 bytes long.

To store data into the BLOB 200, a user would define a user-defined function whose specific name indicates type of the data to be stored, its location in the BLOB, etc. Then, the user can pass in the data to be stored into the BLOB with an INSERT statement that uses the user-defined function. The S.R. system 118 recognizes the encoding of the specific name and uses this information to decode the specific name and identify information for storing data.

The following pseudocode provides a sample user defined function named "MovieTitle" that is used to retrieve a "Title" attribute in a BLOB:

```
CREATE FUNCTION
    MovieTitle (x BLOB, value VARCHAR(100))
        SPECIFIC NAME DMB   <5 characters for offset into attribute>
                            <5 characters for length of attribute>
                            <5 characters for type of attribute>
    RETURNS BLOB()
    EXTERNAL FUNCTION 'Library!SetFunction'
```

In the above sample, a user defined function named "MovieTitle" is created. The function has two parameters. The parameter "x" specifies the BLOB into which data is to be stored. The parameter "Title" specifies the data to be stored into the BLOB. The "specific name" for "MovieTitle" is encoded to specify the location, type, etc. of data to be stored in a BLOB. The BLOB is identified when the "MovieTitle" function is invoked from an application. The "MovieTitle" function has a specific name that is encoded with the information needed to store the "Title" attribute into a BLOB. In particular, the specific name is encoded with a 15 character entry comprised of 5 characters that identify an offset into the BLOB that indicates the start of the attribute, 5 characters that identify the length of the attribute, and 5 characters that identify the type of the attribute. Additionally, the "MovieTitle" function has an indication that the function returns a BLOB and has an external function name. This particular encoding scheme is provided for illustration only; and, the techniques of the invention may be used with many different encoding schemes.

To encode a specific name to store the title attribute in BLOB 200, the following sample specific name statement may be used:

SPECIFIC NAME DMB0000C0000400002

The term "DMB" is fixed, and the S.R. system 118 recognizes that what follows is information about the offset, length, and type of an attribute of a structured object. In particular, the 0000C offset value indicates that the offset from the beginning of the BLOB is 12 bytes. The 00004 length value indicates that the attribute is 4 bytes long. The 00002 type value indicates that the type of this attribute is a string. Therefore, with this information, the S.R. system 118 retrieves data starting at the offset into the structured object, for the specified length of characters, and returns data of the type specified. It is to be understood that the above sample encoding is provided for illustration only, and other encoding formats may be used without departing from the scope of the invention. For example, "DMB" may be replaced with another term, the information may be different encoded may be different. (e.g., instead of type, other information may be submitted), or the number of characters used to encode a particular type of information may be different (e.g., the type may be encoded with 2 characters instead of 5).

The following pseudocode provides a sample select statement that invokes a user defined function "MovieTitle" to access data in a BLOB:

INSERT INTO TABLEX (moviecol) values (MovieTitle (movie, 'z')

In the above insert statement, "moviecol" is a column of TABLEX that stores a BLOB for a movie. The term "values" is a keyword that introduces the data to be inserted into "moviecol" in TABLEX. The user defined function "MovieTitle" is invoked with a "movie" parameter specifying a BLOB and with "z" specifing a movie title. The Insert statement is a type of modification statement that inserts data into a table. It is to be understood that other types of modification statements may be used, such as an Update statement that updates data in a table, to invoke the user defined function "MovieTitle" to access data in a BLOB.

This simplifies the process of developing user defined functions that return information from a structured object. For example, many of the image format types have a predefined header that provides information about the image (e.g., title, copyright, etc.). With the storage and retrieval system 118, a developer who knows about the location of this information in the image could define a user defined function called, for example, "copyright", and encode a specific name to return the copyright attribute of the image, without writing code.

Figure 3:
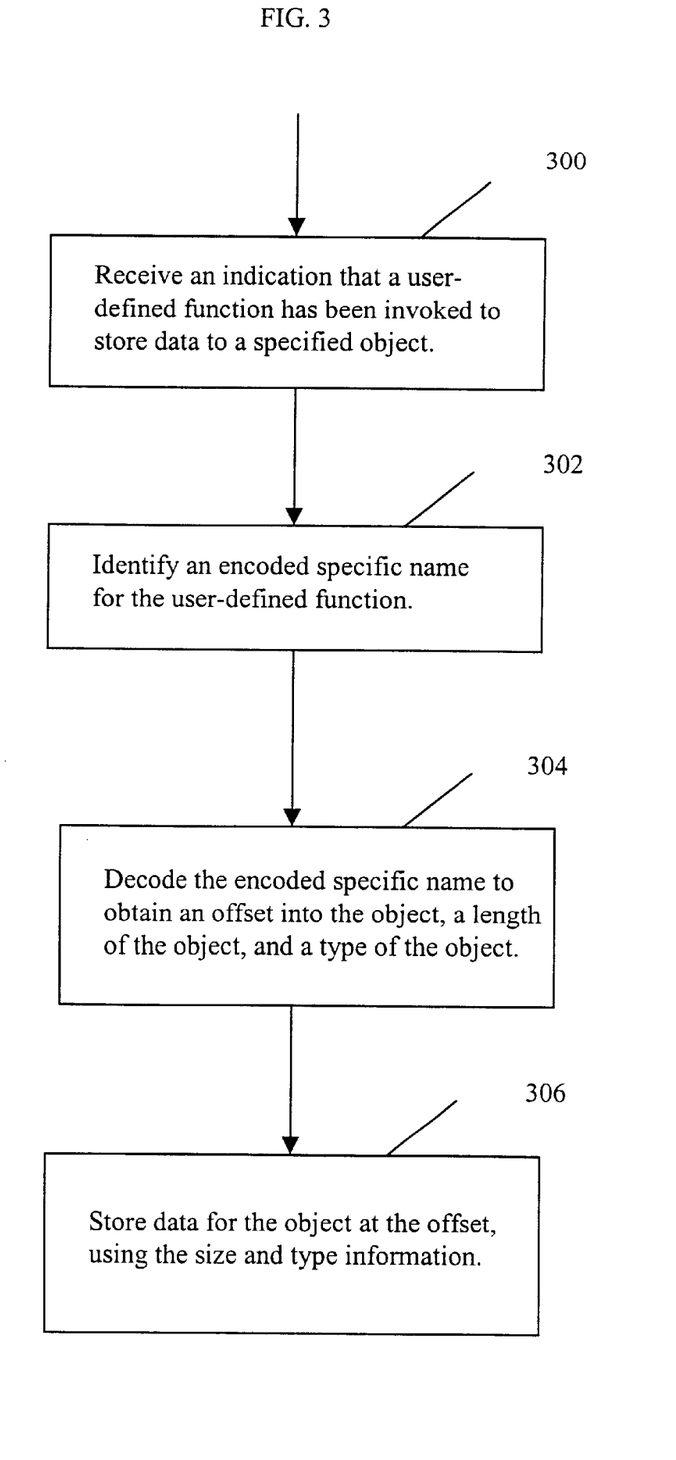
FIG. 3 is a flow diagram illustrating steps performed by a storage and retrieval system to store data.

FIG. 3 is a flow diagram illustrating steps performed by a storage and retrieval system to store data. In block 300, the S.R. system 118 receives an indication that auser-defined function has been invoked to store data to a specified object. In particular, the user-defined function is typically invoked with a parameter that specifies the object and a parameter that provides the data to be stored into the object. In block 302, the S.R. system 118 identifies an encoded specified name for the user-defined function. In block 304, the S.R. system 118 decodes the encoded specific name to obtain an offset into the object, a length of the object, and a type of the object. In block 306, the S.R. system 118 stores data for the object at the offset, using the size and type information.

By eliminating the need for application programmers to writecode to access data in a structured object, the S.R. system 118 makes it easier for application programmers to write application programs that retrieve data from a structured object. This makes it easier for users to use structured object data (e.g., images, videos, music, or time series data) in databases and in their applications.

Figure 4:
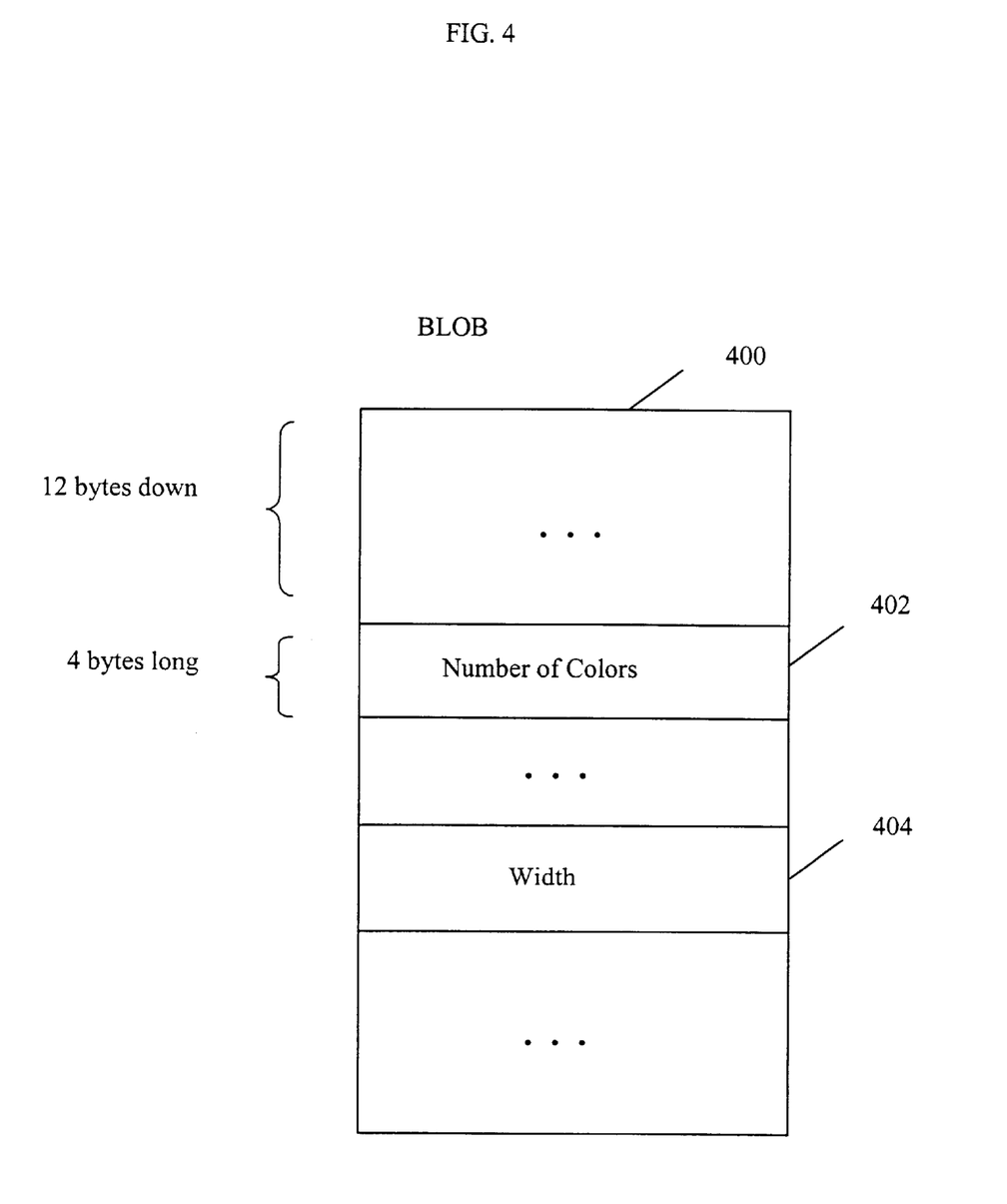
FIG. 4 is a diagram illustrating a binary large object.

FIG. 4 is a diagram illustrating a binary large object. The BLOB 400 has several attributes, such as "Number of Colors" 402 and "Width" 404. The of Colors" attribute 402 is 12 bytes down from the beginning of the BLOB 400 and is 4 bytes long.

To retrieve data from a BLOB 400, a user would define a user-defined function whose specific name indicates type of the data to be retrieved, its location in the BLOB, etc. Then, the user can retrieve data from the BLOB with a SELECT statement that uses the user-defined function. The S.R. system 118 recognizes the encoding of the specific name and uses this information to decode the specific name and identify information for retrieving data.

The following pseudocode provides a sample user defined function named "NumColors" that is used to retrieve a "Number of Colors" attribute in a BLOB:

```
CREATE FUNCTION
    NumColors (x BLOB)
        SPECIFIC NAME DMB   <5 characters for offset into attribute>
                            <5 characters for length of attribute>
                            <5 characters for type of attribute>
        RETURNS INTEGER
        EXTERNAL FUNCTION 'Library!GetFunction'
```

In the above sample, a user defined function named "NumColors" is created. The function has one parameter, "x", which specifies the BLOB from which to retrieve data. The "specific name" for "NumColors" is encoded to specify information that is to be retrieved from a BLOB. The BLOB is identified when the "NumColors" function is invoked from an application. The "NumColors" function has a specific name that is encoded with the information needed to retrieve the "Number of Colors" attribute from a BLOB. In particular, the specific name is encoded with a 15 character entry comprised of 5 characters that identify an offset into the BLOB that indicates the start of the attribute, 5 characters that identify the length of the attribute, and 5 characters that identify the type of the attribute. Additionally, the "NumColors" function has an indication that the function returns an integer and has an external function name. This particular encoding scheme is provided for illustration only; and, the techniques of the invention may be used with many different encoding schemes.

To encode a specific name to retrieve the number of colors attribute in BLOB 400, the following sample specific name statement may be used:

SPECIFIC NAME DMB0000C0000400001

The term "DMB" is fixed, and the S.R. system 118 recognizes that what follows is information about the offset, length, and type of an attribute of a structured object. In particular, the 0000C offset value indicates that the offset from the beginning of the BLOB is 12 bytes. The 00004 length value indicates that the attribute is 4 bytes long. The 00001 type value indicates that the type of this attribute is integer. Therefore, with this information, the S.R. system 118 retrieves data starting at the offset into the structured object, for the specified length of characters, and returns data of the type specified.

The following pseudocode provides a sample select statement that invokes a user defined function "NumColors" to access data in a BLOB:

SELECT NumColors (movie) from movieTable;

The above select statement invokes the user defined function "NumColors" to retrieve the "Number of Colors" attribute 402 from the specified "movie" BLOB, which is in a column in the "movieTable" table.

This simplifies the process of developing user defined functions that return information from a structured object.

For example, many of the image format types have a predefined header that provides information about the image (e.g., size, number of colors, width, etc.). With the storage and retrieval system 118, a developer who knows about the location of this information in the image could define a user defined function called, for example, image_width, and encode a specific name to return the width attribute of the image, without writing code.

Figure 5:
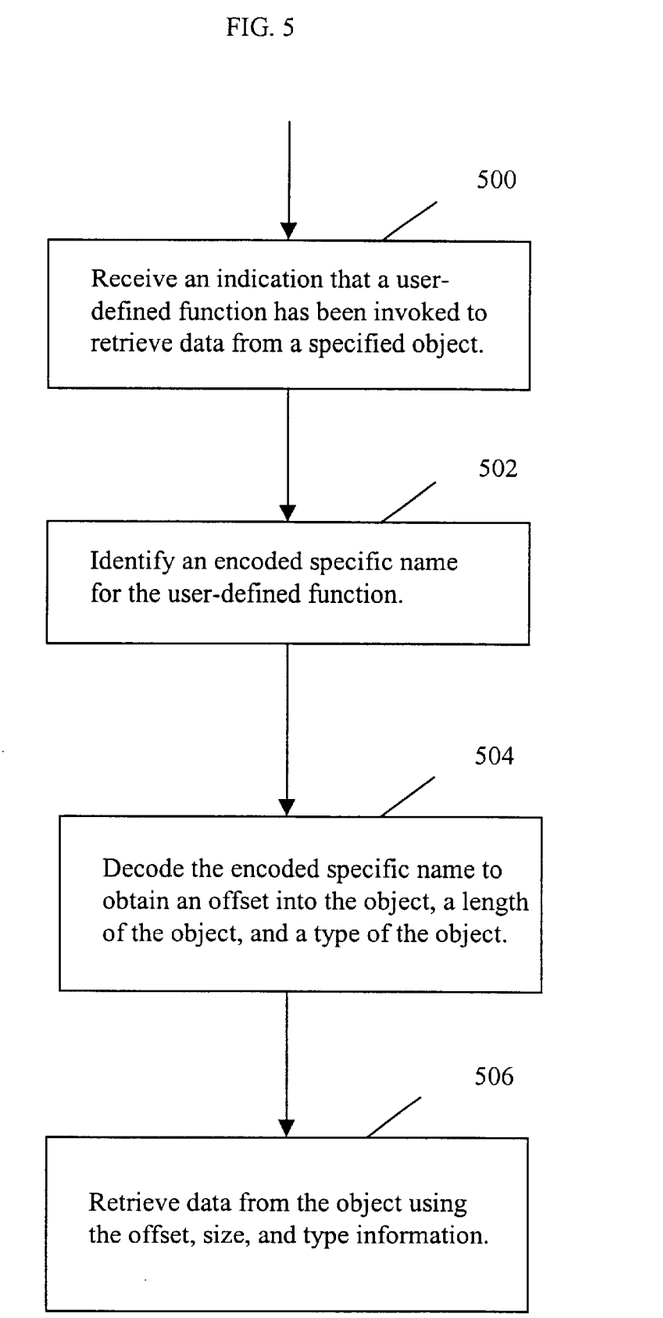
FIG. 5 is a flow diagram illustrating steps performed by a storage and retrieval system to retrieve data.

FIG. 5 is a flow diagram illustrating steps performed by a storage and retrieval system to retrieve data. In block 500, the S.R. system 118 receives an indication that a user-defined function has been invoked to retrieve data from a specified object. In particular, the user-defined function is typically invoked with a parameter that specifies the object. In block 502, the S.R. system 118 identifies an encoded specified name for the user-defined function. In block 504, the S.R. system 118 decodes the encoded specific name to obtain an offset into the object, a length of the object, and a type of the object. In block 506, the S.R. system 118 retrieves data from the object using the offset, size, and type information.

By eliminating the need for application programmers to write code to access data in a structured object, the S.R. system 118 makes it easier for application programmers to write application programs that retrieve data from a structured object. This makes it easier for users to use structured object data (e.g., images, videos, music, or time series data) in databases and in their applications.

Conclusion

This concludes the description of an embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of manipulating a structured object stored on a data store connected to a computer, the method comprising:
    invoking a user-defined function (UDF) for accessing the structured object, wherein a specific name of the UDF encodes information for accessing an attribute of the structured object.

2. The method of claim 1, wherein the encoded information includes an offset into the structured object for storing the attribute.

3. The method of claim 1, wherein the encoded information includes a length of the attribute in the structured object.

4. The method of claim 1, wherein the encoded information includes a type for the attribute.

5. The method of claim 1, wherein the user-defined function stores the attribute in the structured object at a location identified by the encoded information.

6. The method of claim 1, wherein the user-defined function retrieves the attribute from the structure object at a location identified by the encoded information.

7. The method of claim 1, wherein the structured object is a binary large object.

8. The method of claim 1, wherein the user-defined function is invoked with parameters identifying the structured object and the attribute.

9. The method of claim 1, wherein the user-defined function is invoked from a modification statement.

10. The method of claim 1, wherein the user-defined function is invoked from a select statement.

11. The method of claim 1, wherein the specific name is decoded when the user-defined function is invoked.

12. An apparatus for manipulating a structured object, comprising:
    a computer having a data store coupled thereto, wherein the structured object is stored in the data store; and
    means, performed by the computer, for invoking a user-defined function (UDF) for accessing the structured object, wherein a specific name of the UDF encodes information for accessing an attribute of the structured object.

13. The apparatus of claim 12, wherein the encoded information includes an offset into the structured object for storing the attribute.

14. The apparatus of claim 12, wherein the encoded information includes a length of the attribute in the structured object.

15. The apparatus of claim 12, wherein the encoded information includes a type for the attribute.

16. The apparatus of claim 12, wherein the user-defined function stores the attribute in the structured object at a location identified by the encoded information.

17. The apparatus of claim 12, wherein the user-defined function retrieves the attribute from the structured object at a location identified by the encoded information.

18. The apparatus of claim 12, wherein the structured object is a binary large object.

19. The apparatus of claim 12, wherein the user-defined function is invoked with parameters identifying the structured object and the attribute.

20. The apparatus of claim 12, wherein the user-defined function is invoked from a modification statement.

21. The apparatus of claim 12, wherein the user-defined function is invoked from a select statement.

22. The apparatus of claim 12, wherein the specific name is decoded when the user-defined function is invoked.

23. An article of manufacture comprising a program storage medium readable by a computer and embodying one or more instructions executable by the compute to perform method steps for manipulating a structured object stored on a data store connected to the computer, the method comprising:
    invoking a user-defined function (UDF) for accessing the structured object, wherein a specific name of the UDF encodes information for accessing an attribute of the structured object.

24. The article of manufacture of claim 23, wherein the encoded information includes an offset into the structured object for storing the attribute.

25. The article of manufacture of claim 23, wherein the encoded information includes a length of the attribute in the structured object.

26. The article of manufacture of claim 23, wherein the encoded information includes a type for the attribute.

27. The article of manufacture of claim 23, wherein the user-defined function stores the attribute in the structured object at a location identified by the encoded information.

28. The article of manufacture of claim 23, wherein the user-defined function retrieves the attribute from the structured object at a location identified by the encoded information.

29. The article of manufacture of claim 23, wherein the structured object is a binary large object.

30. The article of manufacture of claim 23, wherein the user-defined function is invoked with parameters identifying the structured object and the attribute.

31. The article of manufacture of claim 23, wherein the user-defined function is invoked from a modification statement.

32. The article of manufacture of claim 23, wherein the user-defined function is invoked from a select statement.

33. The article of manufacture of claim 23, wherein the specific name is decoded when the user-defined function is invoked.

* * * * *